United States Patent
Wilde et al.

(10) Patent No.: US 10,936,497 B2
(45) Date of Patent: Mar. 2, 2021

(54) METHOD AND SYSTEM FOR WRITING DATA TO AND READ DATA FROM PERSISTENT STORAGE

(71) Applicant: EMC IP Holding Company LLC, Hopkinton, MA (US)

(72) Inventors: Todd Wilde, Palo Alto, CA (US); Samir Rajadnya, San Jose, CA (US); Karthik Ramachandran, Cupertino, CA (US); Michael Nishimoto, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 78 days.

(21) Appl. No.: 16/412,398

(22) Filed: May 14, 2019

(65) Prior Publication Data
US 2019/0266095 A1  Aug. 29, 2019

Related U.S. Application Data

(63) Continuation of application No. 15/581,963, filed on Apr. 28, 2017, now Pat. No. 10,339,062.

(51) Int. Cl.
*G06F 12/08* (2016.01)
*G06F 12/0864* (2016.01)
(Continued)

(52) U.S. Cl.
CPC ...... *G06F 12/0864* (2013.01); *G06F 12/0868* (2013.01); *G06F 12/0871* (2013.01);
(Continued)

(58) Field of Classification Search
CPC ............ G06F 12/0864; G06F 12/0866; G06F 12/0868; G06F 12/0873; G06F 12/1018; G06F 2212/608
(Continued)

(56) References Cited

U.S. PATENT DOCUMENTS

| 5,708,668 A | 1/1998 | Styczinski |
| 6,351,838 B1 | 2/2002 | Amelia |

(Continued)

FOREIGN PATENT DOCUMENTS

| CN | 101604267 A | 12/2009 |
| CN | 101980137 A | 2/2011 |

(Continued)

OTHER PUBLICATIONS

Definition: time slice; IBM Knowledgebase; Scheduler processor time slice; https://www.ibm.com/support/knowledgecenter/en/ssw_aix_72/performance/sched_proc_time_slice.html; retrieved Jun. 11, 2019.

(Continued)

*Primary Examiner* — Gary J Portka
(74) *Attorney, Agent, or Firm* — Chamberlain Hrdlicka

(57) ABSTRACT

In general, embodiments of the technology relate to a method and system for storing and reading data from persistent storage. More specifically, embodiments of the technology relate to a method and system for storing data in persistent storage, where the data written to the persistent storage is not immediately accessible in the persistent storage (i.e., during the inaccessibility period). In such instances, embodiments of the technology provide a method and system to enable the storage system to service read requests for the data using a primary cache entry table (PCET) and an overflow table.

17 Claims, 6 Drawing Sheets

(51) Int. Cl.
  *G06F 12/0868* (2016.01)
  *G06F 12/0871* (2016.01)
  *G06F 12/0893* (2016.01)
  *G06F 12/123* (2016.01)

(52) U.S. Cl.
  CPC ........ *G06F 12/0893* (2013.01); *G06F 12/123* (2013.01); *G06F 2212/282* (2013.01); *G06F 2212/313* (2013.01); *G06F 2212/608* (2013.01)

(58) Field of Classification Search
  USPC .................. 711/102, 103, 206, 207, 221
  See application file for complete search history.

(56) References Cited

U.S. PATENT DOCUMENTS

| | | | |
|---|---|---|---|
| 6,415,355 | B1 | 7/2002 | Hirofuji |
| 7,398,418 | B2 | 7/2008 | Soran et al. |
| 7,406,621 | B2 | 7/2008 | Lubbers et al. |
| 7,430,706 | B1 | 9/2008 | Yuan et al. |
| 7,543,100 | B2 | 6/2009 | Singhal et al. |
| 7,644,197 | B1 | 1/2010 | Waldorf et al. |
| 7,752,389 | B1 | 7/2010 | Fan |
| 7,934,120 | B2 | 4/2011 | Zohar et al. |
| 8,078,906 | B2 | 12/2011 | Yochai et al. |
| 8,145,840 | B2 | 3/2012 | Koul et al. |
| 3,200,887 | A1 | 6/2012 | Bennett |
| 8,234,445 | B2 | 7/2012 | Chou et al. |
| 8,289,641 | B1 | 10/2012 | Emami |
| 8,316,260 | B1 | 11/2012 | Bonwick |
| 8,327,185 | B1 | 12/2012 | Bonwick |
| 8,352,425 | B2 | 1/2013 | Bourbonnais et al. |
| 8,448,021 | B1 | 5/2013 | Bonwick |
| 8,464,095 | B1 | 6/2013 | Bonwick |
| 8,489,979 | B2 | 7/2013 | Rub |
| 8,554,997 | B1 | 10/2013 | Bonwick et al. |
| 8,560,772 | B1 | 10/2013 | Piszczek et al. |
| 8,719,520 | B1 | 5/2014 | Piszczek et al. |
| 8,725,931 | B1 | 5/2014 | Kang |
| 8,782,505 | B2 | 7/2014 | Rub |
| 8,843,782 | B2 | 9/2014 | Guan |
| 8,924,776 | B1 | 12/2014 | Molloy et al. |
| 8,977,942 | B2 | 3/2015 | Wu et al. |
| 9,021,183 | B2 | 4/2015 | Matsuyama et al. |
| 9,152,499 | B1 | 10/2015 | Molloy et al. |
| 9,529,674 | B2 | 12/2016 | Pereira et al. |
| 9,552,242 | B1 | 1/2017 | Leshinsky et al. |
| 9,760,493 | B1 | 9/2017 | Wang |
| 10,095,414 | B2 | 10/2018 | Zettsu et al. |
| 2002/0161972 | A1 | 10/2002 | Talagala et al. |
| 2003/0093740 | A1 | 5/2003 | Stojanovic |
| 2004/0153961 | A1 | 8/2004 | Park et al. |
| 2004/0177219 | A1 | 9/2004 | Meehan et al. |
| 2004/0225926 | A1 | 11/2004 | Scales et al. |
| 2005/0166083 | A1 | 7/2005 | Frey et al. |
| 2005/0223156 | A1 | 10/2005 | Lubbers et al. |
| 2005/0229023 | A1 | 10/2005 | Lubbers et al. |
| 2006/0085594 | A1 | 4/2006 | Roberson et al. |
| 2006/0112261 | A1 | 5/2006 | Yourst et al. |
| 2006/0190243 | A1 | 8/2006 | Barkai et al. |
| 2007/0061383 | A1 | 3/2007 | Ozawa et al. |
| 2008/0109602 | A1 | 5/2008 | Ananthamurthy et al. |
| 2008/0120484 | A1 | 5/2008 | Zhang et al. |
| 2008/0168225 | A1 | 7/2008 | O'Connor |
| 2009/0187786 | A1 | 7/2009 | Jones et al. |
| 2010/0005364 | A1 | 1/2010 | Higurashi et al. |
| 2010/0082540 | A1 | 4/2010 | Isaacson et al. |
| 2010/0199125 | A1 | 8/2010 | Reche |
| 2011/0055455 | A1 | 3/2011 | Post et al. |
| 2011/0258347 | A1 | 10/2011 | Moreira et al. |
| 2012/0030425 | A1 | 2/2012 | Becker-Szendy et al. |
| 2012/0079318 | A1 | 3/2012 | Colgrove et al. |
| 2012/0089778 | A1 | 4/2012 | Au et al. |
| 2012/0166712 | A1 | 6/2012 | Lary |
| 2012/0297118 | A1 | 11/2012 | Gorobets et al. |
| 2012/0303576 | A1 | 11/2012 | Calder et al. |
| 2012/0324156 | A1 | 12/2012 | Muralimanohar et al. |
| 2013/0151754 | A1 | 6/2013 | Post et al. |
| 2013/0185735 | A1 | 7/2013 | Farrell et al. |
| 2014/0359608 | A1 | 12/2014 | Tsirkin et al. |
| 2015/0324387 | A1 | 11/2015 | Squires |
| 2016/0132432 | A1 | 5/2016 | Shen et al. |
| 2016/0148708 | A1 | 5/2016 | Tuers et al. |
| 2016/0210060 | A1 | 7/2016 | Dreyer |
| 2016/0239345 | A1 | 8/2016 | Rachlin |
| 2016/0239421 | A1 | 8/2016 | Abraham et al. |
| 2016/0320986 | A1 | 11/2016 | Bonwick |
| 2017/0124327 | A1 | 5/2017 | Kumbhar et al. |
| 2017/0192889 | A1 | 7/2017 | Sato et al. |
| 2017/0255405 | A1 | 9/2017 | Zettsu et al. |
| 2017/0285945 | A1 | 10/2017 | Kryvaltsevich |
| 2017/0300249 | A1 | 10/2017 | Geml et al. |
| 2017/0329675 | A1 | 11/2017 | Berger et al. |
| 2017/0351604 | A1 | 12/2017 | Tang et al. |
| 2018/0032333 | A1 | 2/2018 | Sullivan |
| 2018/0150326 | A1 | 5/2018 | Xia et al. |
| 2018/0267897 | A1 | 9/2018 | Jeong |
| 2019/0235762 | A1* | 8/2019 | Kaburaki ............ G06F 12/0864 |

FOREIGN PATENT DOCUMENTS

| | | |
|---|---|---|
| CN | 103019617 A | 4/2013 |
| CN | 103577111 A | 2/2014 |
| CN | 103902465 A | 7/2014 |
| CN | 104871138 A | 8/2015 |
| EP | 1577774 A2 | 9/2005 |
| JP | 2004-326759 A | 11/2004 |
| JP | 2010-508604 A | 3/2010 |
| WO | 2008/054760 A2 | 5/2008 |

OTHER PUBLICATIONS

Definition: time slice; Microsoft Computer Dictionary, Fifth Edition; pp. 656; 2015; ISBN: 0735614954.
Definition: time slice; Wikipedia; https://en.wikipedia.org/wiki/Preemption_(computing); retrieved Jun. 11, 2019.
Decision to Grant a Patent issued in corresponding Japanese Application No. 2015-501902, dated May 31, 2016 (6 pages).
Minoru Uehara; "Othogonal RAID with Multiple Parties in Virtual Large-Scale Disks"; IPSJ SIG Technical Report; vol. 2011-DPS-149; No. 4; Nov. 24, 2011 (8 pages).
H. Peter Anvin; "The mathematics of RAID-6"; http://kernel.org/pub/linux/kernel/people/hpa/raid6.pdf (last visited Nov. 15, 2017) (9 pages).
Amber Huffman; "NVM Express: Revision 1.0b"; Jul. 12, 2011 (126 pages).
Akber Kazmi; "PCI Express™ Basics & Applications in Communication Systems"; PCI-SIG Developers Conference; 2004 (50 pages).
Derek Percival; "Multicast Over PCI Express®," PCI-SIG Developers Conference Europe; 2009 (33 pages).
Jack Regula; "Using Non-transparent Bridging in PCI Express Systems"; PLX Technology, Inc.; Jun. 1, 2004 (31 pages).

* cited by examiner

METHOD AND SYSTEM FOR WRITING DATA TO AND READ DATA FROM PERSISTENT STORAGE

BACKGROUND

Storage systems include functionality to service write requests and read requests. More specifically, traditional storage systems include functionality to write data to persistent storage and then immediately read this data from the persistent storage.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description In the following description of FIGS. 1-7, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to a method and system for storing and reading data from persistent storage. More specifically, embodiments of the technology relate to a method and system for storing data in persistent storage, where the data written to the persistent storage is not immediately accessible in the persistent storage (i.e., during the inaccessibility period). In such instances, embodiments of the technology provide a method and system to enable the storage system to service read requests for the data using a primary cache entry table (PCET) and an overflow table.

Figure 1:
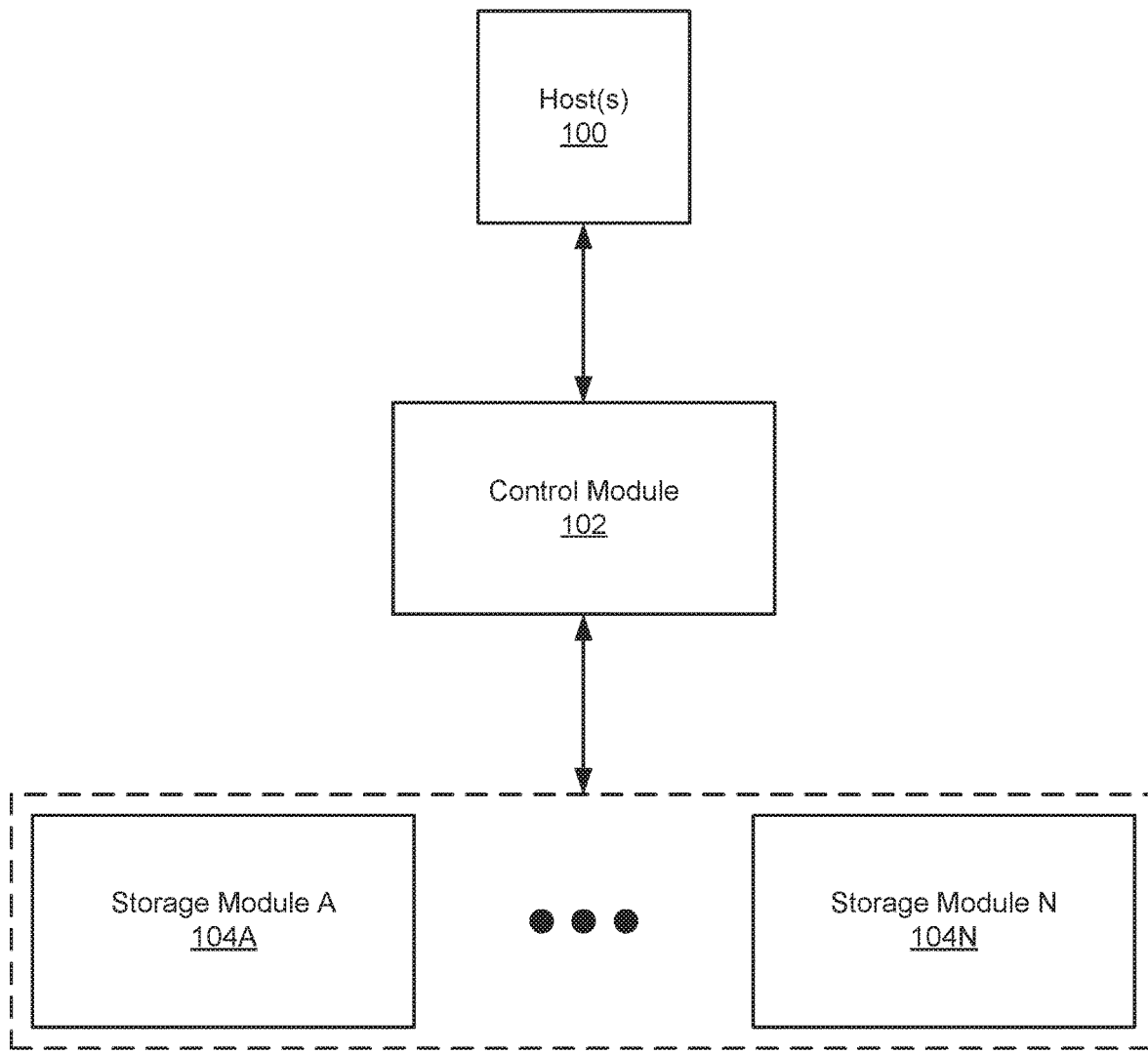
FIG. 1 shows a system in accordance with one or more embodiments of the technology.

FIG. 1 shows a system in accordance with one embodiment of the technology. As shown in FIG. 1, the system includes one or more hosts (100), a control module (102), and one or more storage modules (104A, 104N).

In one embodiment of the technology, a host (100) is any system or process executing on a system that includes functionality to issue read requests and/or write requests to the control module. In one embodiment of the technology, the hosts (100) may each include a processor (not shown), memory (not shown), and persistent storage (not shown). In one embodiment of the technology, the control module is configured to receive write requests and read requests from one or more hosts (100) and to transmit the received requests to the appropriate storage module(s) (104A, 104N). Additional detail about the storage modules is provided below in FIGS. 2-7. Further, the control module (102) includes functionality to receive responses to the aforementioned requests and to provide the responses to the appropriate host(s) (100). In one embodiment of the technology, the control module includes a processor (not shown) configured to execute instructions to implement one or more embodiments of the technology, where the instructions are stored on a non-transitory computer readable medium (not shown) that is located within, or that is operatively connected to, the control module (102). Alternatively, the control module may be implemented using hardware. Those skilled in the art will appreciate that the control module (102) may be implemented using any combination of software and/or hardware.

In one embodiment of the technology, the hosts (100) are configured to communicate with the control module (102) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the technology is not limited to the aforementioned protocols.

In one embodiment of the technology, the control module (102) is configured to communicate with the storage modules (104A, 104N) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the technology is not limited to the aforementioned protocols.

Those skilled in the art will appreciate that the technology is not limited to the architecture shown in FIG. 1.

Figure 2:
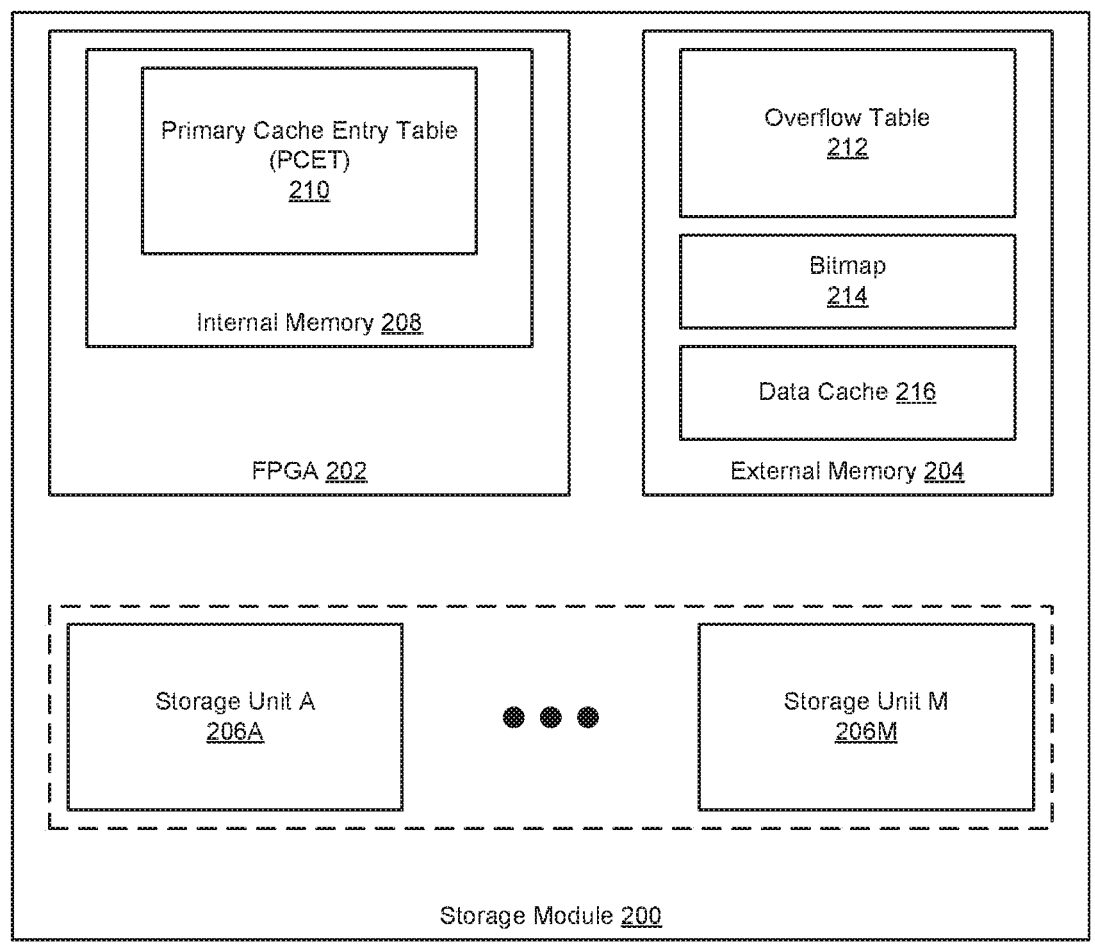
FIG. 2 shows a storage module in accordance with one or more embodiments of the technology.

FIG. 2 shows a storage module in accordance with one or more embodiments of the technology. The storage module (200) includes a field programmable gate array (FPGA) (202), an external memory (204), and one or more storage units (206A, 206M). Each of these components is described below.

Figure 5:
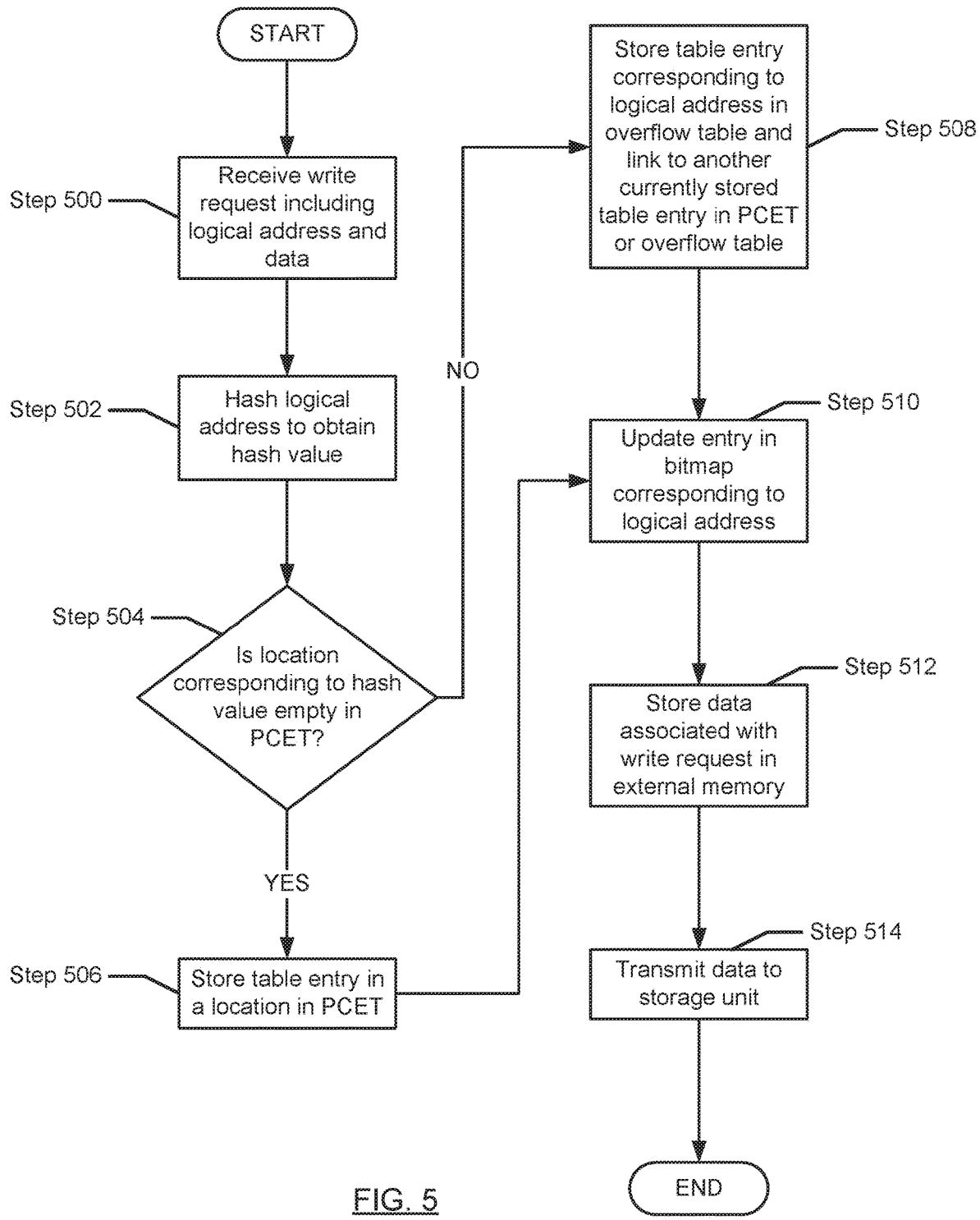
FIG. 5 shows a method for writing data to a field programmable gate array (FPGA) and persistent storage in accordance with one or more embodiments of the technology.
Figure 6:
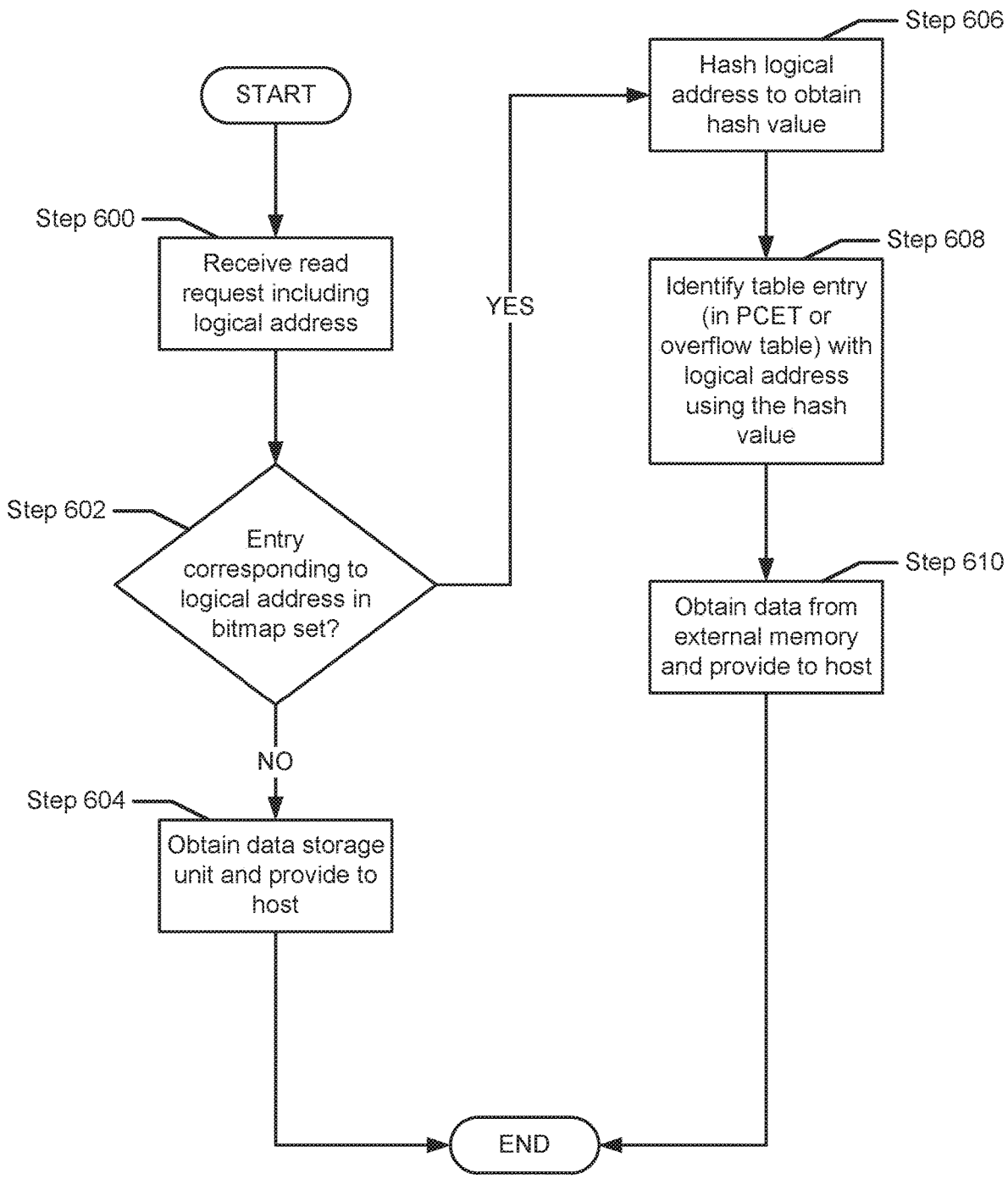
FIG. 6 shows a method for reading data from the FPGA and the persistent storage in accordance with one or more embodiments of the technology.
Figure 7:
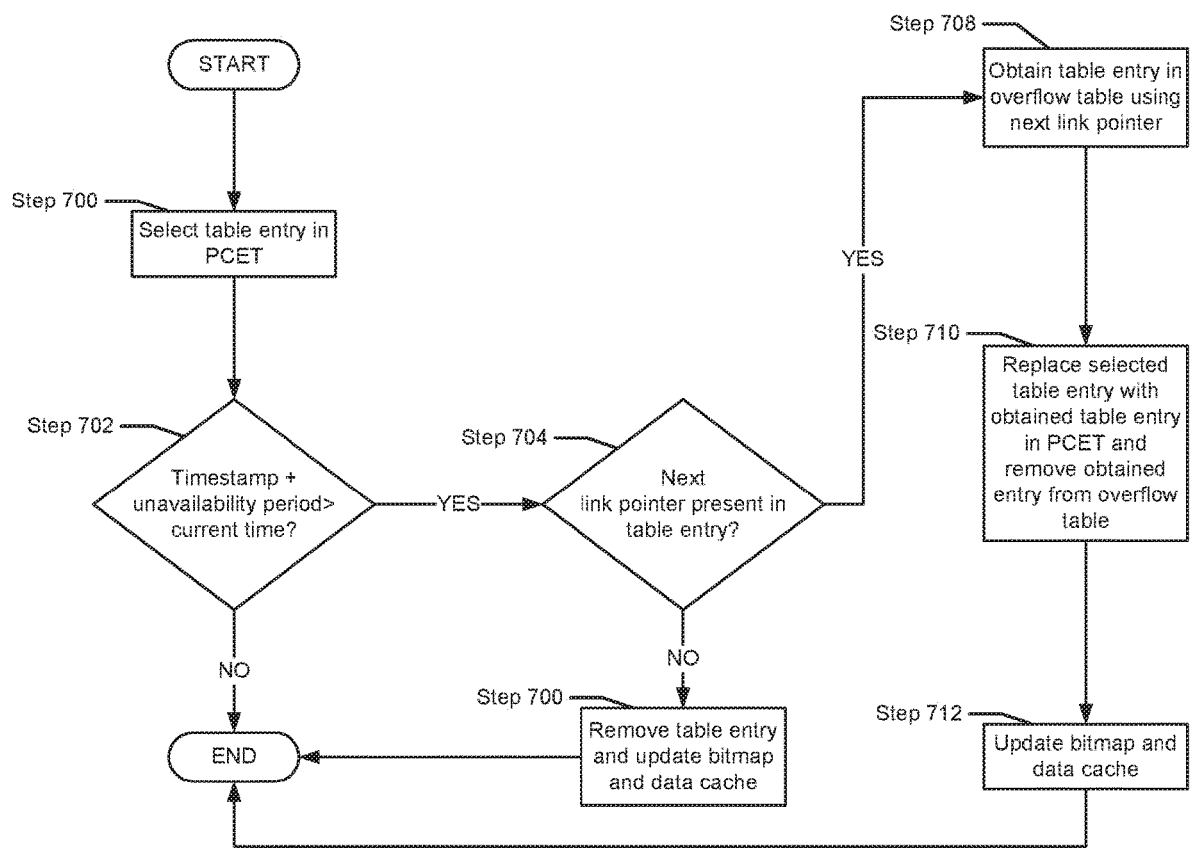
FIG. 7 shows a method for updating the table entries in the primary cache entry table and overflow table in accordance with one or more embodiments of the technology.

In one embodiment of the technology, the FPGA (202) is an integrated circuit that is configured to perform all or a portion of the methods described in FIGS. 5-7. The FPGA (202) includes internal memory (208). The internal memory (208) is volatile memory, which is located directly on the FPGA and, as such, data stored in the internal memory may be more quickly accessed (i.e., accessed with a lower latency) as compared with data stored in the external memory (204). The internal memory (208) includes a primary cache entry table (PCET) (210). The PCET includes a set of table entries. Additional detail about table entries is provided in FIG. 3.

In one embodiment of the technology, the external memory (204) is volatile memory, which includes an overflow table (212), a bitmap (214), and a data cache (216). Each of these components is described below. The overflow table (212), like the PCET (210), includes table entries. However, the size of the overflow table (212) is typically significantly larger than the size of the PCET (210). More specifically, the size of the PCET (210) is limited by the size of the internal memory that may be located on the FPGA (202); however, the size of the overflow table (212) is determined such that there is a sufficient number of table entries to ensure that all read requests issued to storage module for data that cannot be read during the unavailability period can be serviced using the PCET and/or the overflow table (212). If there is not sufficient space to store an appropriate number of table entries in the PCET and the overflow table, then the storage module may not be able to service all read requests for data issued during the unavailability period (see e.g., FIG. 6). In one embodiment of the technology, the specific size of the overflow table may be based on the maximum number of write requests that may be serviced during the unavailability period.

In one embodiment of the technology, the bitmap (214) includes an entry for each logical address that may be used by hosts issuing read and/or write requests to the storage module (200). Additional detail about the use of the bitmap is described in FIGS. 5 and 6.

In one embodiment of the technology, the data cache (216) temporarily stores data that has been written to the storage units. The data stored in the data cache (216) is used to service read requests for the data when the data cannot be retrieved from the storage units (i.e., during the unavailability period).

In one embodiment of the technology, each of the storage units (206A, 206M) includes persistent storage. The persistent storage may include magnetic storage media, optical storage media, solid state storage media, phase change storage media, any other suitable type of persistent storage media, or any combination thereof. In one embodiment of the technology, the persistent storage media may have an unavailability period. More specifically, when data is written to such persistent storage media, the data may not be read from the persistent storage media for a period of time (referred to as an unavailability period). The unavailability period may vary depending on specific implementation of the persistent storage media.

Those skilled in the technology will appreciate that the technology is not limited to the architecture shown in FIG. 2. For example, while FIG. 2 shows an FPGA, embodiments of the technology may be implemented using an application-specific integrated circuit (ASIC). Alternatively, the storage module shown in FIG. 2 may also be implemented using other combinations of hardware, software, and/or firmware, without departing from the technology.

Figures 3, 4:
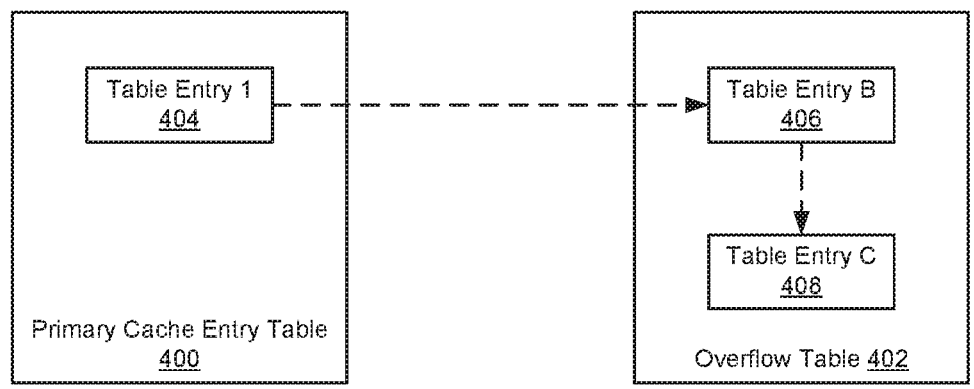
FIG. 3 shows an example of a table entry in accordance with one or more embodiments of the technology.
FIG. 4 shows an example of how table entries in the primary cache entry table and the overflow table may be related.

FIG. 3 shows an example of a table entry in accordance with one or more embodiments of the technology. Each table entry (300) includes a valid (302) bit, a logical address (304), a next link pointer (306), and a timestamp (308). Each of these components is described below.

The valid (302) bit is used to determine whether the given table entry may be removed from the PCET or the overflow table. More specifically, when the data with which the table entry is associated may not be read from any of the storage units, the valid (302) bit may be set in order to signify that the table entry (300) is valid and may not be removed from the PCET or the overflow table. Further, when the data with which the table entry is associated may be read from one or more of the storage units, the valid (302) bit may be cleared in order to signify that the table entry (300) may be removed from the PCET or the overflow table.

The logical address (304) corresponds to the logical address in the write request that resulted in the creation of the table entry (see e.g., FIG. 5). The next link pointer (306) may be null or it may point to another table entry in the overflow table. Additional details about the use of the next link pointer (306) are provided below in FIGS. 4-7. The timestamp (308) corresponds to a value which denotes when the table entry was created.

FIG. 4 shows an example of how table entries in the primary cache entry table and the overflow table may be related. In one embodiment of the technology, each table entry in the PCET (400) may include a next link pointer to zero or one table entry in the overflow table (402). Further, each table entry in the overflow table (402) is associated with a table entry in the PCET and may include a next link pointer to zero or one table entry in the overflow table (402). Further, table entries that are associated with each other using next link pointers are all associated with the same hash value but different logical addresses (see e.g., FIG. 5).

Turning to the example, consider a scenario in which Table Entry A (404) was initially stored in the PCET (400). At a later point in time, Table Entry B (406) is created and stored in the overflow table (402) and the next link pointer in Table Entry A (404) is updated to reference Table Entry B (406). Table Entry C (408) is then created and stored in the overflow table (402). At this time, the next link pointer in Table Entry B is updated to reference Table Entry C (408).

Turning to the flowcharts, while the various steps in the flowchart are presented and described sequentially, one of ordinary skill will appreciate that some or all of the steps may be executed in different orders, may be combined or omitted, and some or all of the steps may be executed in parallel. Further, the processes described in the various flowcharts may be performed serially, concurrently and/or in parallel by the storage modules.

FIG. 5 shows a method for writing data to the FPGA and persistent storage in accordance with one or more embodiments of the technology. FIG. 5 is from the perspective of the storage module.

In Step 500, a write request is received by the storage module from a host, where the write request includes a logical address and data.

In Step 502, the FPGA applies a hash function to the logical address in order to generate a hash value. The following is a set of non-limiting hash functions that may be used: SHA-1, MD5, any non-cryptographic hash function, any keyed cryptographic hash function, and/or any non-keyed cryptographic hash function.

In Step 504, a determination is made about whether there is a table entry stored in the PCET at the location associated with the hash value. Said another, the PCET includes N number of physical locations, where each of the N number of physical locations is associated with a hash value. Accordingly, the determination is step 504 is used to ascertain whether the location in the PCET associated with the hash value is full (i.e., currently storing a valid table entry) or is empty (i.e., no table entry is stored or an invalid table entry is stored at the location). If the location associated with the hash value is empty (or currently storing an invalid table entry), then the process proceeds to step 506; otherwise, the process proceeds to step 508.

In Step 506, a table entry is generated and stored in the physical location in the PCET corresponding to the hash value. At the time the table entry is stored in PCET, the next link pointer is set to null. The process then proceeds to Step 510.

In scenarios in which the location in the PCET associated with the hash value is full, then in Step 508, a table entry is generated and stored in an available location in the overflow table. The location in the overflow table may be selected randomly or using any other selection method. Continuing with the discussion of step 508, a next link pointer in a table entry in the PCET or a table entry in the overflow table is updated to reference the table entry created in step 508 (see e.g., FIG. 4). The process then proceeds to step 510.

In Step 510, the entry in the bitmap associated with the logical address in the write request is set.

In Step 512, the data associated with the write request is stored in the data cache in the external memory. In one embodiment of the technology, the location in which data is stored is associated with the table entry (i.e., the table entry stored in step 506 or 508). Said another way, the FPGA maintains a mapping between a table entry and the location in the data cache in which the data is stored. This mapping is used to obtain the data from the data cache (see e.g., FIG. 6).

In Step 514, the FPGA transmits the data (i.e., the data retrieved from the host) to at least one of the storage units in the storage module.

FIG. 6 shows a method for reading data from the FPGA and the persistent storage in accordance with one or more embodiments of the technology.

In Step 600, a read request is received from a host. The read request includes a logical address.

In Step 602, a determination is made about whether an entry in bitmap corresponding to the logical address is set. If the entry is not set, then the data may be accessed from one or more of the storage units and, as such, the process proceeds to step 604. However, if the entry is set, then the data cannot be retrieved from the storage unit (e.g., because of the unavailability period) and, as such, the process proceeds to step 606.

In Step 604, the data corresponding to the logical address is obtained from the appropriate storage unit and provided to the host. The FGPA may be configured to retrieve the data from the storage unit and provide the retrieved data to the host.

Continuing with the discussion of FIG. 6, in Step 606, the logical address in read request is hashed to obtain a hash value. The hash function used in step 606 is the same hash function used in step 502.

In Step 608, the hash value is used to identify a table entry in the PCET or the overflow table that includes the logical address (i.e., the logical address in the read request). The following is an example of how the table entry may be identified. The following example is described with respect to FIG. 4. The example is not intended to limit the technology.

Turning to the example, consider a scenario in which the hash value generated in step 606 corresponds to a physical location in the PCET (400) in which Table Entry A (404) is stored. Accordingly, the logical address in Table Entry A is compared to the logical address from the read request. In this example, the logical address in Table Entry A (404) does not match the logical address in the read request. Thus, the next link pointer in Table Entry A is used to identify a next table entry in the overflow table (402). In this example, Table Entry B (406) is the next identified table entry. Similar to the evaluation of Table Entry A, the logical address in Table Entry B is compared to the logical address from the read request. In this example, the logical address in Table Entry B (406) matches the logical address in the read request. Accordingly, the Table Entry B is the table entry identified in step 608. If the logical address in Table Entry B did not match the logical address in the read request, then the next link pointer in Table Entry B would be used to identify Table Entry C. Table Entry C would then be evaluated in the same manner as Table Entries A and B. The aforementioned process would continue until a table entry is identified.

Continuing with the discussion of FIG. 6, in Step 610, the data associated with the logical address is obtained from the data cache in the external memory from the location associated with identified table entry. The obtained data is subsequently provided to the host that issued the read request.

FIG. 7 shows a method for updating the table entries in the primary cache entry table and overflow table in accordance with one or more embodiments of the technology.

In Step 700, a table entry in the primary cache entry table is selected.

In Step 702, a determination is made about whether the calculated time (i.e., the time value determined by combining the timestamp in the selected table entry and the unavailability period) is greater than the current time. The following is a non-limiting example of determining a calculated time. Turning to the example, consider a scenario in which the timestamp is T1 and the unavailability period is P, then the calculated time is T1+P. Further, if the current time is T2, then the determination made is step 702 is whether (T1+P) >T2. If the calculated time is greater than the current time, then the unavailability period for the data has elapsed and the data may be obtained from the appropriate storage unit and, as such, the process proceeds to step 704. However, if the calculated time is less than the current time, then the unavailability period for the data has not elapsed and the data may not be obtained from a storage unit and, as such, the process in FIG. 7 ends.

Continuing with the discussion of FIG. 7, in Step 704, a determination is made about whether the selected table entry has a non-null next link pointer. If the table entry has a non-null next link pointer, then the process proceeds to step 708; otherwise the process proceeds to step 706.

In Step 706, the table entry is selected table entry is removed (or the valid bit in the table entry is updated to signify that the table entry is invalid). Further, the entry in the bitmap corresponding to the logical address in the selected table entry is updated to indicate that there is no corresponding table entry in the PCET (e.g., the entry in the bitmap is updated from one to zero). The data corresponding to the removed table entry is also removed (or set as invalid) in the data cache. The process then ends.

Continuing with the discussion of FIG. 7, if the selected table entry has a non-null next link pointer, then in Step 708, a table entry referenced by the next link pointer is identified in the overflow table.

In Step 710, the table entry in the PCET (i.e., the table entry selected in step 700) is replaced by the table entry in identified in step 708.

In Step 712, the entry in the bitmap corresponding to the logical address in the selected table entry is updated to indicate that there is no corresponding table entry (e.g., the entry in the bitmap is updated from one to zero). The data corresponding to the removed table entry is also removed (or set as invalid) in the data cache. The process then ends.

The process described in FIG. 7 may be continuously repeated for all table entries in the PCET.

One or more embodiments of the technology may be implemented using instructions executed by one or more processors in the storage appliance. Further, such instructions may correspond to computer readable instructions that are stored on one or more non-transitory computer readable mediums.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for storing data in a storage module, wherein the storage module comprises a field programmable gate array (FPGA), an external memory operatively connected to the FPGA, and a storage unit comprising persistent storage and operatively connected to the FPGA, wherein the method comprises:
   receiving a write request comprising a logical address and datum;
   storing, based on a determination that a location in a primary cache entry table associated with the logical address is full, a table entry corresponding to the logical address in an overflow table in the external memory;
   updating a bitmap entry corresponding to the logical address, wherein the bitmap entry is in bitmap stored in the external memory;
   storing the datum in the external memory; and
   transmitting a copy of the datum to the persistent storage.

2. The method of claim 1, wherein determining that the location associated with the logical address in the primary cache entry table is full comprises:
   hashing the logical address to obtain a hash value;
   determining, using the hash value, that the location in the primary cache entry table is full;
   identifying a location in the overflow table; and
   storing the table entry in the location in the overflow table.

3. The method of claim 2, wherein a table entry at the location in the primary cache entry table comprises a reference to the table entry in the location in the overflow table.

4. The method of claim 1, further comprising:
   receiving, from a client, a read request comprising a second logical address;
   determining that an entry in the bitmap corresponding to the second logical address is set;
   based on the determination, identifying a second table entry from the primary cache entry table;
   obtaining, from the external memory, a copy of second datum from a location associated with the second table entry; and
   providing the copy of the second datum to the client.

5. The method of claim 1, further comprising:
   receiving, from a client, a read request comprising a second logical address;
   determining that an entry in the bitmap corresponding to the second logical address is not set;
   based on the determination, obtaining, from the persistent storage, a copy of second datum; and
   providing the copy of the second datum to the client.

6. The method of claim 1, further comprising:
   selecting the table entry at the location in the primary cache entry table;
   determining that the table entry at the location in the primary cache entry table has been present in the primary cache entry table for a time period that exceeds an unavailability period associated with the persistent storage;
   based on the determination, marking the table entry at the location in the primary cache entry table as invalid.

7. The method of claim 6, further comprising:
   after marking the table entry as invalid, replacing the table entry at the location in the primary cache entry table with the table entry in the overflow table.

8. The method of claim 1, further comprising:
   selecting the table entry;
   determining that the table entry has been present in the primary cache entry table for a time period that exceeds an unavailability period associated with the persistent storage;
   based on the determination:
      identifying the table entry in the location in the overflow table using a reference, wherein the table entry in the primary cache entry table comprises the reference, and
      replacing the table entry in the primary cache entry table with the table entry in the overflow table.

9. A storage module, comprising:
   a field programmable gate array (FPGA) comprising internal memory;
   an external memory operatively connected to the FPGA and comprising an overflow table and wherein a size of the overflow table is based on a maximum number of write requests that may be serviced during an unavailability period of a persistent storage; and
   a storage unit operatively connected to the FPGA and comprising the persistent storage,
   wherein the FPGA is configured to:
      receive a write request comprising a logical address and a first datum;
      store a table entry corresponding to the logical address in a primary cache entry table in the internal memory;
      update, in a bitmap stored in the external memory, a bitmap entry corresponding to the logical address;
      store the first datum in the external memory;
      transmit a copy of the first datum to the persistent storage, wherein the copy of the first datum is stored in the persistent storage upon receipt from the FPGA, wherein the persistent storage enters the unavailability period when the copy of the first datum is written to the persistent storage, wherein the copy of the first datum is unable to be read from persistent storage during the unavailability period,
   wherein the FPGA is further configured to service a read request for the first datum during the unavailability period of the persistent storage using the first datum in the external memory.

10. The storage module of claim 9, wherein the FPGA is further configured to:
   receive a write request comprising a second logical address and second datum;
   store a second table entry corresponding to the second logical address in an overflow table;

update a bitmap entry corresponding to the second logical address;
store the second datum in the external memory; and
transmit a copy of the second datum to the persistent storage.

11. The storage module of claim 10, wherein storing the second table entry in the overflow table comprises:
hashing the second logical address to obtain a hash value;
determining, using the hash value, that a location in the primary cache entry table is full;
identifying a location in the overflow table; and
based on the determination, storing the second table entry in the location in the overflow table,
wherein the table entry comprises a reference to the second table entry.

12. The storage module of claim 9, wherein storing the table entry in the primary cache entry table comprises:
hashing the logical address to obtain a hash value;
determining, using the hash value, that a location in the primary cache entry table is empty; and
based on the determination, storing the table entry in the location.

13. The storage module of claim 9, wherein the FPGA is further configured to:
receive, from a client, a read request comprising the logical address;
determine that an entry in the bitmap corresponding to the logical address is set;
based on the determination, identify the table entry from the primary cache entry table;
obtain, from the external memory, a second copy of the first datum from a location associated with the table entry; and
provide the second copy of the first datum to the client.

14. The storage module of claim 9, wherein the FPGA is further configured to:
receive, from a client, a read request comprising the logical address;
determine that an entry in the bitmap corresponding to the logical address is not set;
based on the determination, obtain, from the persistent storage, a second copy of the first datum; and
provide the second copy of the first datum to the client.

15. The storage module of claim 9, wherein the FPGA is further configured to:
select the table entry;
determine that the table entry has been present in the primary cache entry table for a time period that exceeds the unavailability period of the persistent storage;
based on the determination, mark the table entry as invalid; and
after marking the table entry as invalid, replacing the table entry with a second table entry generated in response to a second write request.

16. The storage module of claim 9, wherein the FPGA is further configured to:
select the table entry;
determine that the table entry has been present in the primary cache entry table for a time period that exceeds the unavailability period of the persistent storage;
based on the determination:
identify a second table entry, wherein the table entry comprises a reference to the second table entry, and
replace the table entry with the second table entry.

17. The storage module of claim 9, wherein the persistent storage comprises phase change storage media.

* * * * *